(12) United States Patent
Watanabe (10) Patent No.: US 9,274,575 B2
(45) Date of Patent: Mar. 1, 2016

(54) INFORMATION PROCESSING APPARATUS AND INFORMATION PROCESSING METHOD (71) Applicant: Ayako Watanabe, Kanagawa (JP)

(72) Inventor: Ayako Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 91 days.

(21) Appl. No.: 14/328,799

(22) Filed: Jul. 11, 2014

(65) Prior Publication Data

US 2015/0022725 A1 Jan. 22, 2015

(30) Foreign Application Priority Data

Jul. 16, 2013 (JP) ................................. 2013-147807

(51) Int. Cl.
| | |
|---|---|
| G03B 21/00 | (2006.01) |
| G06F 1/26 | (2006.01) |
| H04N 5/74 | (2006.01) |
| H04W 4/02 | (2009.01) |
| G03B 21/14 | (2006.01) |
| H04N 9/31 | (2006.01) |
| H04N 21/41 | (2011.01) |
| H04N 21/45 | (2011.01) |
| H04N 21/485 | (2011.01) |

(52) U.S. Cl.
CPC *G06F 1/26* (2013.01); *G03B 21/14* (2013.01); *H04N 5/7425* (2013.01); *H04N 9/3155* (2013.01); *H04N 21/4122* (2013.01); *H04N 21/4524* (2013.01); *H04N 21/4854* (2013.01); *H04W 4/023* (2013.01)

(58) Field of Classification Search
CPC .................. G02B 2027/014; G02B 2027/0093; G02B 2027/0101; G02B 2027/0138; H04N 13/0022; H04N 13/0271; H04N 7/15; H04N 7/142; G03B 21/14; G03B 21/26; G03B 21/54

See application file for complete search history.

(56) References Cited

U.S. PATENT DOCUMENTS

| | | | |
|---|---|---|---|
| 2003/0011754 A1 | 1/2003 | Yaniv et al. | |
| 2011/0178863 A1* | 7/2011 | Daigle | G06Q 30/0231 705/14.31 |
| 2011/0214044 A1* | 9/2011 | Davis | G06T 11/00 715/201 |
| 2013/0165151 A1 | 6/2013 | Gits et al. | |
| 2013/0201316 A1* | 8/2013 | Binder | H04L 67/12 348/77 |

FOREIGN PATENT DOCUMENTS

JP 2005-227548 8/2005

OTHER PUBLICATIONS

The extended European search report dated Feb. 25, 2015.

\* cited by examiner

*Primary Examiner* — Sultan Chowdhury
(74) *Attorney, Agent, or Firm* — IPUSA, PLLC (57) ABSTRACT

In an information processing apparatus, a communication unit communicates with notifying apparatuses that store position information thereof and notifies, in a case in which a communication is made with first terminals that are held by respective users, identification information of the first terminals and the position information, and in a case in which a communication is made with a second terminal that is mounted on a screen, identification information of the second terminal and the position information. A control unit obtains an estimated value of distances between the screen and the users, from distances between the second terminal and each of the first terminals, based on the position information received from the notifying apparatuses, and determines a lamp power to be set to a projection apparatus that projects video on the screen, based on the estimated value.

8 Claims, 10 Drawing Sheets

| LATITUDE | LONGITUDE | CONFERENCE ROOM No. |
|---|---|---|
| 35.55711 | 139.72015 | 2 |

| TERMINAL INFORMATION ||
|---|---|
| IDENTIFICATION INFORMATION | TYPE |
| rrts | USER |

| CONFERENCE ROOM No. | PROJECTOR MODEL NAME | PROJECTOR IP ADDRESS | DISTANCE (m) BETWEEN USER & SCREEN | SUITABLE LAMP POWER OF PROJECTOR |
|---|---|---|---|---|
| 1 | W4430 | 255.255.255.001 | ~5 | LOW |
| | | | 5~10 | MEDIUM |
| | | | 10~ | HIGH |
| 2 | X2561 | 255.255.255.002 | ~2 | LOW |
| | | | 2~5 | MEDIUM |
| | | | 5~10 | HIGH |
| | | | 10~ | MAXIMUM |
| ⋮ | | | | |

| MANAGEMENT ID | IDENTIFICATION INFORMATION | TYPE | LATITUDE | LONGITUDE | CONFERENCE ROOM No. | RECEPTION DATE & TIME |
|---|---|---|---|---|---|---|
| 1 | ackd | SCREEN | 35.55711 | 139.72015 | 2 | 2013/3/26 13:50 |
| 2 | rrts | USER | 35.55716 | 139.72016 | 2 | 2013/3/26 14:03 |
| 3 | oekl | USER | 35.55720 | 139.72016 | 2 | 2013/3/26 14:03 |
| 4 | ltod | USER | 35.55712 | 139.72018 | 2 | 2013/3/26 14:03 |
| 5 | obnr | SCREEN | 35.55730 | 139.72020 | 5 | 2013/3/25 20:05 |
| 6 | mdkl | USER | 35.55732 | 139.72022 | 5 | 2013/3/26 8:03 |
| 7 | pqkf | USER | 35.55729 | 139.72022 | 5 | 2013/3/26 8:36 |

INFORMATION PROCESSING APPARATUS AND INFORMATION PROCESSING METHOD

CROSS-REFERENCE TO RELATED APPLICATIONS

This application is based upon and claims the benefit of priority of Japanese Patent Application No. 2013-147807, filed on Jul. 16, 2013, the entire contents of which are incorporated herein by reference.

BACKGROUND OF THE INVENTION

1. Field of the Invention

The present invention generally relates to communication systems, and more particularly to an information processing apparatus and an information processing method.

2. Description of the Related Art

Recently, a technique has been developed to transmit signals by wireless transmission from a video output interface that outputs screens of video apparatuses, such as a PC (Personal Computer), to a display apparatus, such as a projector and a monitor, in order to project the screens onto the display apparatus. A system that employs this technique is often referred to as a wireless network projector system. The wireless network projector system forms a wireless network utilizing a wireless LAN (Local Area Network) or millimeter wave communication, without the use of a cable or the like.

In a case in which a user who is viewing an image projected by the projector is located near a screen, the image is visible to the user in most cases even when a lamp of the projector is not very bright. In addition, when the lamp of the projector is bright, the user may experience a glare caused by reflected light from the screen.

On the other hand, in a case in which the user who is viewing the image projected by the projector is located far away from the screen, the user may find it difficult to see the image unless the lamp of the projector is bright.

Accordingly, a suitable brightness of the lamp of the projector, that is, a lamp power, differs depending on the distance between the user and the screen.

For example, a Japanese Laid-Open Patent Publication No. 2005-227548 proposes a projector that determines a light emitting amount of a lamp depending on a distance, illuminance, and zoom, for the purposes of extending a serviceable life of the lamp.

However, the user must manually operate the projector in order to change the lamp power of the projector.

SUMMARY OF THE INVENTION

Accordingly, it is an object in one embodiment of the present invention to provide a novel and useful information processing apparatus and information processing method, in which the problem described above can be suppressed.

Another and more specific object in one embodiment of the present invention is to provide an information processing apparatus and an information processing method, which can suitably or automatically set a lamp power of a projection apparatus.

According to one aspect of the present invention, there is provided an information processing apparatus including a communication unit configured to communicate with a plurality of position information notifying apparatuses that store position information thereof and notify, in a case in which a communication is made with a plurality of first communication terminals that are held by respective users, identification information of the plurality of first communication terminals and the position information, and in a case in which a communication is made with a second communication terminal that is mounted on a screen, identification information of the second communication terminal and the position information; and a control unit configured to obtain an estimated value of distances between the screen and the users, from distances between the second communication terminal and each of the plurality of first communication terminals, based on the position information received from the plurality of position information notifying apparatuses by the communication unit, and to determine a lamp power to be set to a projection apparatus that projects video on the screen, based on the estimated value, wherein the communication unit notifies the lamp power determined by the control unit to the projection apparatus.

Other objects and further features of the present invention will be apparent from the following detailed description when read in conjunction with the accompanying drawings.

DESCRIPTION OF THE PREFERRED EMBODIMENTS

A description will be given of embodiments of the information processing apparatus and the information processing method according to the present invention, by referring to the drawings. In the drawings, those parts that are the same are designated by the same reference numerals, and a description of the same parts will not be repeated.

<Communication System>

Figure 1:
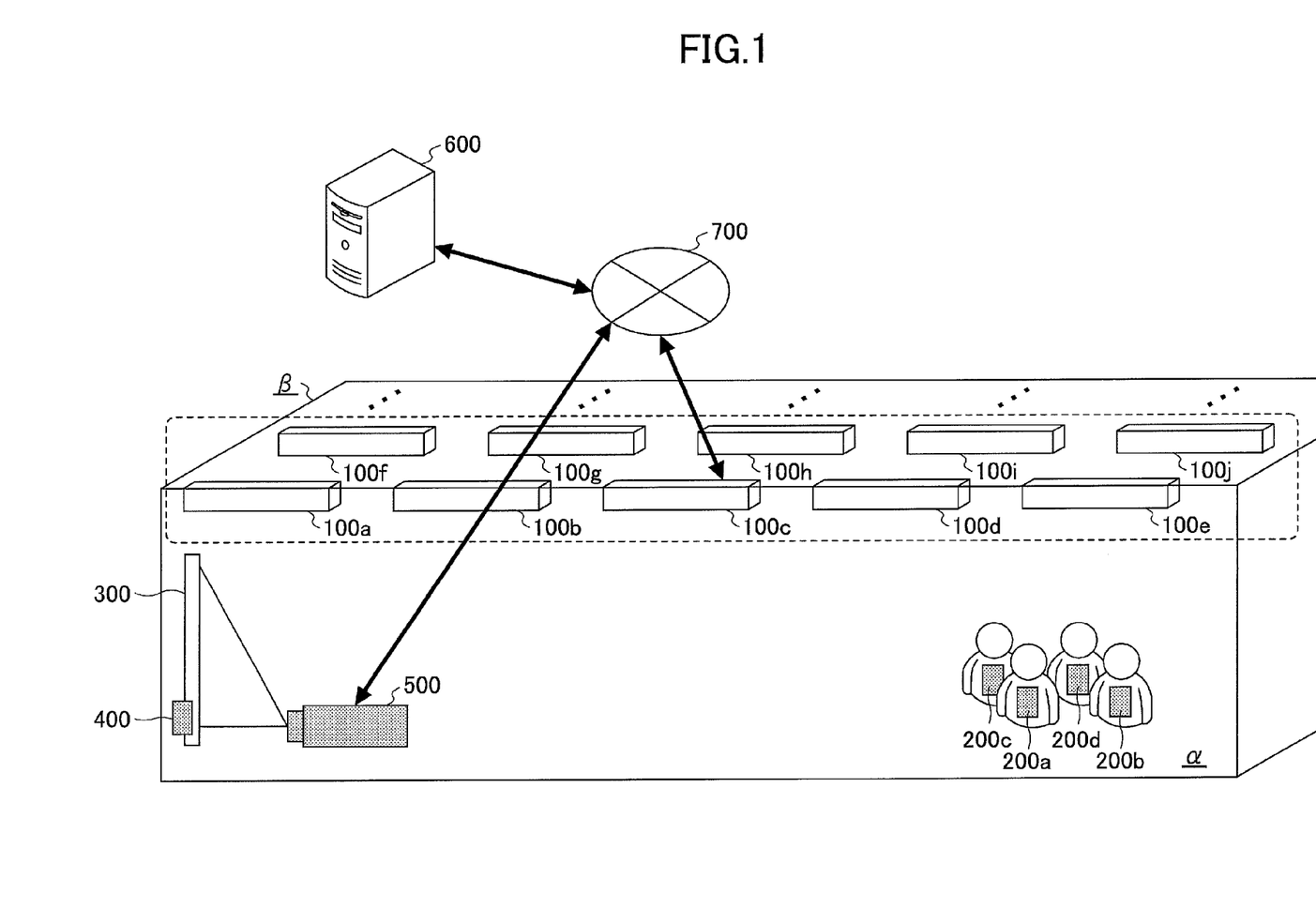
FIG. 1 is a diagram illustrating a communication system in one embodiment.

FIG. 1 is a diagram illustrating a communication system in one embodiment. More particularly, FIG. 1 illustrates a wireless network projector system that is an example of the communication system.

The wireless network projector system illustrated in FIG. 1 includes position information detectors 100a, 100b, 100c, 100d, 100e, 100f, 100g, 100h, 100i, and 100j that are examples of a position information notifying apparatus. The wireless network projector system further includes first communication terminals 200a, 200b, 200c, and 200d, a screen 300, a second communication terminal 400, a projector (or projection apparatus) 500, and a server 600 that is an example of an information processing apparatus.

In this embodiment, an arbitrary one of the position information detectors 100a, 100b, 100c, 100d, 100e, 100f, 100g, 100h, 100i, and 100j (hereinafter also referred to as "position information detectors 100a through 100j") is referred to as a position information detector 100. In addition, in this embodiment, an arbitrary one of the first communication terminals 200a, 200b, 200c, and 200d (hereinafter also referred to as "first communication terminals 200a through 200d") is referred to as a first communication terminal 200.

The position information detectors 100a through 100j, the projector 500, and the server 600 are connected via a communication network 700.

The position information detectors 100a through 100j are provided on a ceiling β of a house (or interior) α. The first communication terminals 200a through 200d are held by users who view an image displayed on the screen 300, and are located on a floor of the house α. In one embodiment of the wireless network projector system, it is assumed for the sake of convenience that a conference room is an example of the house α. However, the present invention is similarly applicable to a case in which the wireless network projector system is introduced into the house α other than the conference room. In addition, the wireless network projector system can be applied within the house α, by arranging the position information detectors 100a through 100j at an upper side of the house α.

Each of the first communication terminals 200a through 200d is provided with a wireless communication function that uses a near field communication technique such as BLUETOOTH (registered trademark), ZIGBEE (registered trademark), or the like. Each of the first communication terminals 200a through 200d holds identification information thereof. Each of the first communication terminals 200a through 200d notifies the identification information thereof to the near position information detector 100 amongst the position information detectors 100a through 100j. Functions of each of the first communication terminals 200a through 200d may be provided in an ID (Identification) card.

The second communication terminal 400 may have a configuration similar to that of the first communication terminal 200. In other words, the second communication terminal 400 is provided with a wireless communication function that uses the near field communication technique such as BLUETOOTH (registered trademark), ZIGBEE (registered trademark), or the like. The second communication terminal 400 holds identification information thereof. The second communication terminal 400 may be mounted (or adhered) on the screen 300 onto which the image is projected by the projector 500, or may be arranged near the screen 300.

The second communication terminal 400 notifies the identification information thereof to the near position information detector 100 amongst the position information detectors 100a through 100j.

Each of the position information detectors 100a through 100j is provided with a wireless communication function that uses the near field communication technique. Each of the position information detectors 100a through 100j may receive the identification information from the first communication terminal 200 and the second communication terminal 400. Each of the position information detectors 100a through 100j may be provided on the ceiling β of the conference room.

Each of the position information detectors 100a through 100j stores position information indicating a position (hereinafter also referred to as "provided position") where each of the position information detectors 100a through 100j are provided on the ceiling β. The provided position of each of the position information detectors 100a through 100j may be represented by latitude and longitude. In addition, the provided position of each of the position information detectors 100a through 100j may be represented by an identifier (for example, conference room No.) of the conference room. Further, the provided position of each of the position information detectors 100a through 100j may be represented by information other than the latitude and longitude, such as a position in a coordinate system that has its origin within a predetermined position within the conference room, for example.

In this embodiment, the position information indicating the position of each of the position information detectors 100a, 100b, 100c, 100d, 100e, 100f, 100g, 100h, 100i, and 100j is denoted by Xa, Xb, Xc, Xd, Xe, Xf, Xg, Xh, Xi, and Xj, respectively. In addition, the position information indicating the position of an arbitrary position information detector 100 amongst the position information detectors 100a through 100j is denoted by X.

In a case in which each of the position information detectors 100a through 100j is notified of the identification information from the first communication terminal 200 and the second communication terminal 400, each position information detector notifies the identification information, together with the position information stored in each position information detector, to the server 600.

The server 600 stores identification information of the projector 500 provided in each conference room, the distance between the user and the screen 300, and lamp power information of the projector 500 suitable for each distance, in an associated manner for each conference room. The distance between the user and the screen 300 is segmented into one or a plurality of segments, and the lamp power information of the projector 500 suited for each segment is stored in the associated manner. The information stored in the server 600 may be preset, because the suitable lamp power may differ depending on the brightness of the conference room, the material used for the screen 300, or the like.

The server 600 obtains the lamp power to be set to the projector 500, based on the position information corresponding to each of the first communication terminals 200a through 200d and the position information corresponding to the second communication terminal 400, notified from the position information detector 100. The server 600 notifies setting information (hereinafter also referred to as "lamp power setting information") that is to be set, to the projector 500.

The projector 500 projects arbitrary information, video, or the like onto the screen 300. The projector 500 sets the lamp power thereof based on the lamp power setting information notified from the server 600.

Next, a more detailed description will be given of the position information detector 100, the first communication terminal 200, the second communication terminal 400, the server 600, and the projector 500.

Figure 2:
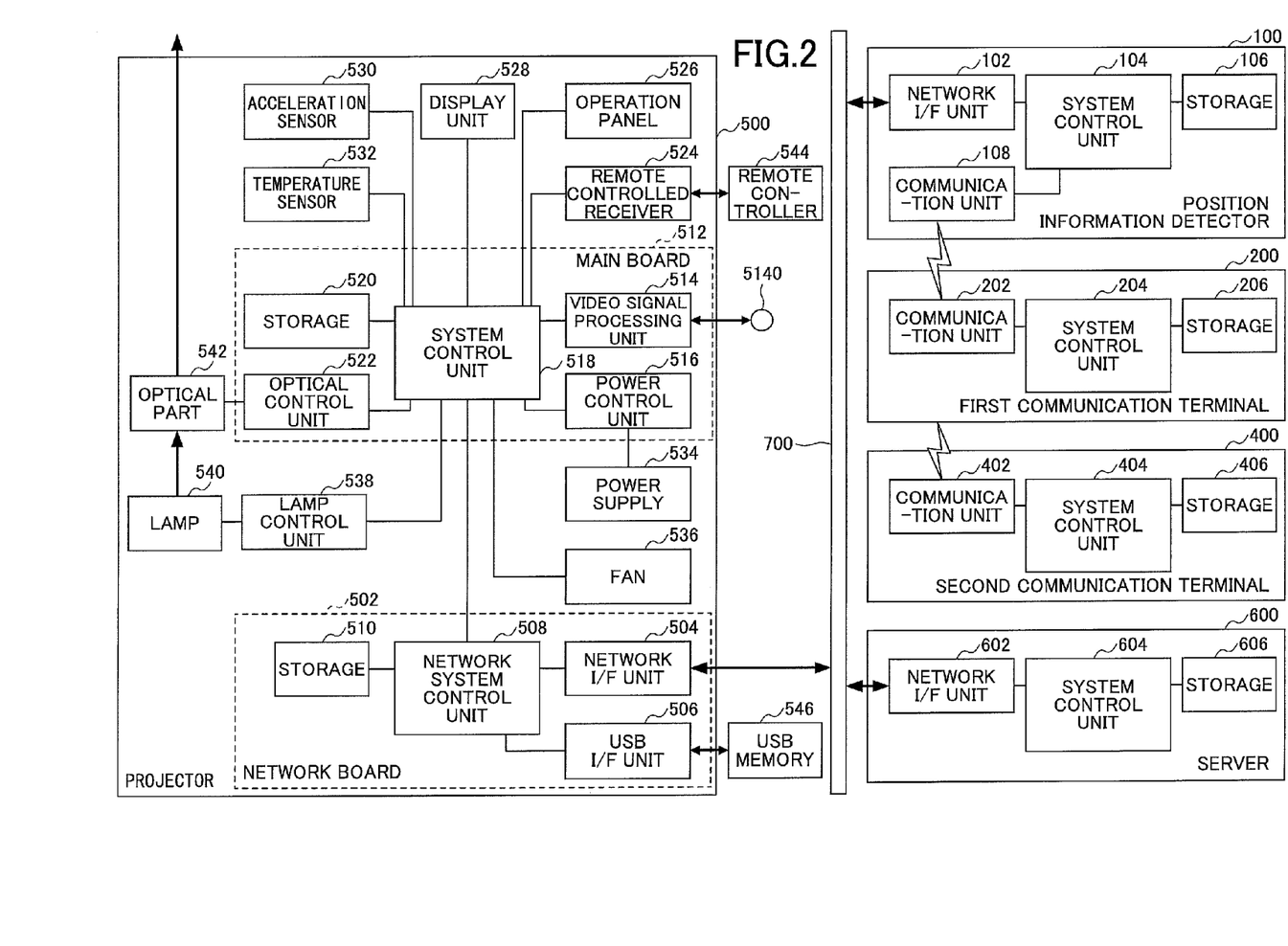
FIG. 2 is a block diagram illustrating the communication system in one embodiment.

FIG. 2 is a block diagram illustrating the communication system in one embodiment. More particularly, FIG. 2 illustrates the wireless network projector system that is an example of the communication system.

FIG. 2 mainly illustrates a hardware configuration of the position information detector 100, the first communication terminal 200, the second communication terminal 400, the server 600, and the projector 500.

<Position Information Detector 100>

The position information detector 100 includes a network interface (hereinafter also referred to as "I/F") unit 102, a system control unit 104, a storage 106, and a communication unit 108.

The network I/F unit 102 provides an interface between the position information detector 100 and the communication network 700, so that the position information detector 100 may communicate with the projector 500 and the server 600 via the communication network 700. A connection between the network I/F unit 102 and the communication network 700 may be a cable connection or a wireless connection.

The system control unit 104 is connected to the network I/F unit 102. The system control unit 104 controls the operation of the position information detector 100. The system control unit 104 may be formed by a processing unit, such as a CPU (Central Processing Unit) or the like.

The storage 106 is connected to the system control unit 104. The storage 106 stores the position information X of the position information detector 100. In addition, the storage 106 stores various programs for causing the position information detector 100 to perform various operations.

Figure 3:
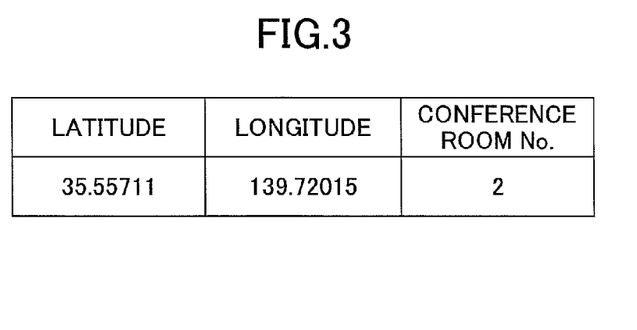
FIG. 3 is a diagram illustrating an example of position information of a position information detector.

FIG. 3 is a diagram illustrating an example of the position information X of the position information detector 100 stored in the storage 106.

As illustrated in FIG. 3, the position information X in this example includes the latitude, the longitude, and the conference room No. where the position information detector 100 is provided or set up. The position information X may include the latitude and the longitude where the position information detector 100 is provided, and the conference room No. may be excluded from the position information X.

The communication unit 108 is connected to the system control unit 104. The communication unit 108 is provided with a wireless communication function that uses the near field communication technique, and may make wireless communications with the first communication terminal 200 and the second communication terminal 400. The communication unit 108 may receive, via the wireless communications, the identification information from the first communication terminal 200 and the second communication terminal 400. The communication unit 108 preferably receives the identification information periodically.

<Functions of Position Information Detector 100>

Figure 4:
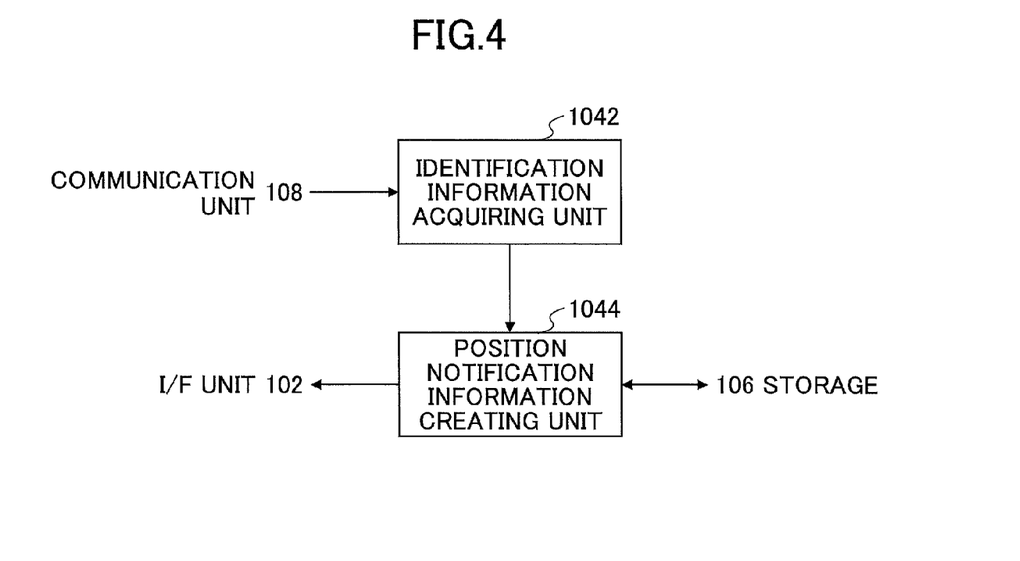
FIG. 4 is a functional block diagram illustrating the position information detector in one embodiment.

FIG. 4 is a functional block diagram illustrating the position information detector 100 in one embodiment.

The functions illustrated in the functional block diagram of FIG. 4 may mainly be performed by the system control unit 104. The processing unit forming the system control unit 104 may function as an identification information acquiring unit 1042 and a position notification information creating unit 1044.

The processing unit forming the system control unit 104 may perform the functions of the identification information acquiring unit 1042 and the position notification information creating unit 1044 by executing application programs (or firmware) stored within the processing unit, or by executing the application programs stored in the storage 106 provided externally to the processing unit.

The identification information acquiring unit 1042 acquires the identification information of the first communication terminal 200 and the second communication terminal 400 received via the communication unit 108. The identification information acquiring unit 1042 inputs the identification information from the first communication terminal 200 and the second communication terminal 400 to the position notification information creating unit 1044.

The position notification information creating unit 1044 is connected to the identification information acquiring unit 1042. The position notification information creating unit 1044 acquires the position information stored in the storage 106 in a case in which the identification information is input from the identification information acquiring unit 1042. The position notification information creating unit 1044 creates position notification information having the server 600 as its destination, by adding the identification information input from the identification information acquiring unit 1042 to the position information acquired from the storage 106. The position notification information creating unit 1044 transmits the position notification information via the network I/F unit 102. The position notification information creating unit 1044 preferably transmits the position notification information periodically.

<First Communication Terminal 200>

The first communication terminal 200 includes a communication unit 202, a system control unit 204, and a storage 206.

The communication unit 202 is provided with a wireless communication function that uses the near field communication technique, and may make a wireless communication to transmit the identification notification information to the position information detector 100.

The system control unit 204 is connected to the communication unit 202. The system control unit 204 controls the operation of the first communication terminal 200. The system control unit 204 may be formed by a processing unit, such as a CPU or the like.

The storage 206 is connected to the system control unit 204. The storage 206 stores terminal information of the first communication terminal 200. In addition, the storage 206 stores various programs for causing the first communication terminal 200 to perform various operations.

Figure 5:
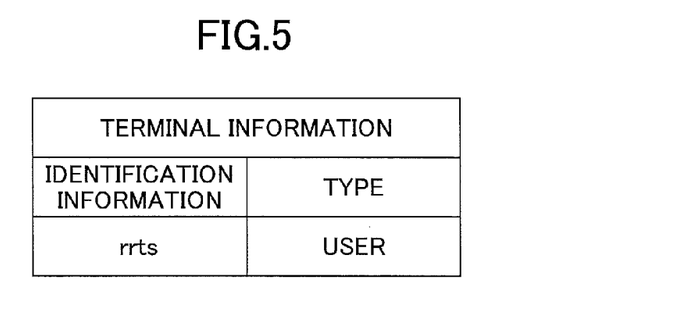
FIG. 5 is a diagram illustrating an example of terminal information of a first communication terminal and a second communication terminal.

FIG. 5 is a diagram illustrating an example of the terminal information of the first communication terminal 200 stored in the storage 206. The terminal information illustrated in FIG. 5 may be terminal information of the second communication terminal 400 which will be described later.

As illustrated in FIG. 5, the terminal information in this example includes identification information and type. The identification information is the information unique to the first communication terminal 200. The type indicates an owner (or user), apparatus, or the like to which the first communication terminal 200 belongs. For example, in a case in which the first communication terminal 200 belongs to the user, the type in this case is the user. In a case in which the first communication terminal 200 belongs to (or is mounted on) the screen 300, the type in this case is the screen 300. Of course, the type to which the first communication terminal 200 belongs is not limited to the owner (or user), screen 300, or the like, and the first communication terminal 200 may belong to any "object", including an apparatus or the like.

In the example illustrated in FIG. 5, "rrts" is stored as the identification information, and "user" is stored as the type. The example of the identification information is a MAC (Media Access Control) address of the first communication terminal 100. However, the identification information is not limited to the MAC address, and information other than the MAC address may be used as long as the information is capable of identifying the first communication terminal 200. The example of the type identifies whether the identification information is from the first communication terminal 200 or the second communication terminal 400. In a case in which the first communication terminal 200 and the second communication terminal 400 are identifiable in the server 600 from the identification information, the type may be omitted from the terminal information.

<Functions of First Communication Terminal 200>

Figure 6:
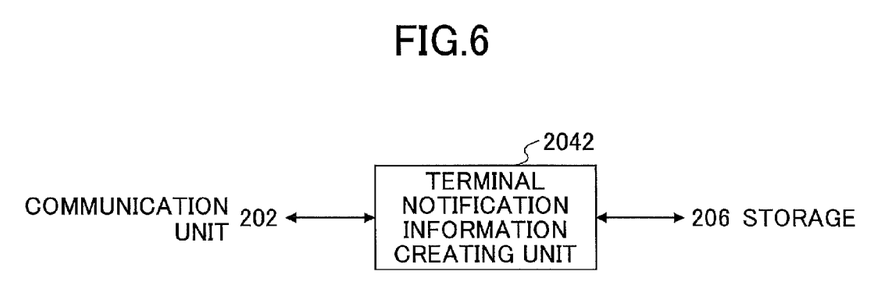
FIG. 6 is a functional block diagram illustrating the first communication terminal in one embodiment.

FIG. 6 is a functional block diagram illustrating the first communication terminal 200 in one embodiment.

The functions illustrated in the functional block diagram of FIG. 6 may mainly be performed by the system control unit 204. The processing unit forming the system control unit 204 may function as a terminal notification information creating unit 2042.

The processing unit forming the system control unit 204 may perform the functions of the terminal notification information creating unit 2042 by executing application programs (or firmware) stored within the processing unit, or by executing the application programs stored in the storage 206 provided externally to the processing unit.

The terminal notification information creating unit 2042 acquires the terminal information stored in the storage 206, and creates terminal notification information having the server 600 as its destination, by adding the terminal information acquired from the storage 206. The terminal notification information creating unit 2042 transmits the terminal notification information via the communication unit 202. The terminal notification information creating unit 2042 preferably transmits the terminal notification information periodically via the communication unit 202.

<Second Communication Terminal 400>

The second communication terminal 400 includes a communication unit 402, a system control unit 404, and a storage.

The communication unit 402 is provided with a wireless communication function that uses the near field communication technique, and may make a wireless communication to transmit the identification notification information to the position information detector 100.

The system control unit 404 is connected to the communication unit 402. The system control unit 404 controls the operation of the second communication terminal 400. The system control unit 404 may be formed by a processing unit, such as a CPU or the like.

The storage 406 is connected to the system control unit 404. The storage 406 stores terminal information of the second communication terminal 400. In addition, the storage 406 stores various programs for causing the second communication terminal 400 to perform various operations.

An example of the terminal information stored in the storage 406 may be similar to the terminal information illustrated in FIG. 5 described above.

<Functions of Second Communication Terminal 400>

Figure 7:
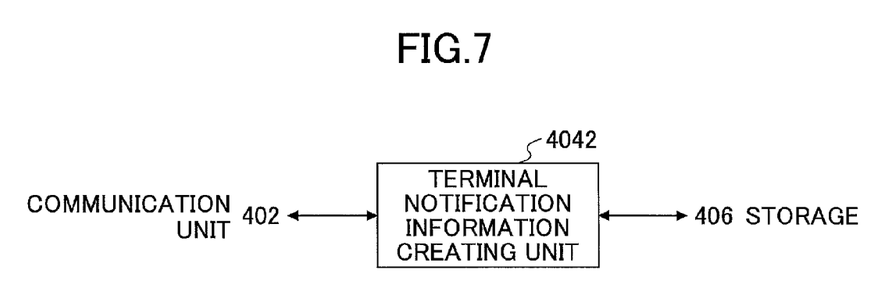
FIG. 7 is a functional block diagram illustrating the second communication terminal in one embodiment.

FIG. 7 is a functional block diagram illustrating the second communication terminal 400 in one embodiment.

The functions illustrated in the functional block diagram of FIG. 7 may mainly be performed by the system control unit 404. The processing unit forming the system control unit 404 may function as a terminal notification information creating unit 4042.

The processing unit forming the system control unit 404 may perform the functions of the terminal notification information creating unit 4042 by executing application programs (or firmware) stored within the processing unit, or by executing the application programs stored in the storage 406 provided externally to the processing unit.

The terminal notification information creating unit 4042 acquires the terminal information stored in the storage 406, and creates terminal notification information having the server 600 as its destination, by adding the terminal information acquired from the storage 406. The terminal notification information creating unit 4042 transmits the terminal notification information via the communication unit 402. The terminal notification information creating unit 4042 preferably transmits the terminal notification information periodically via the communication unit 402.

<Server 600>

The server 600 includes a network I/F unit 602 that functions as a communication unit, a system control unit 604, and a storage 606.

The network I/F unit 602 provides an interface between the server 600 and the communication network 700, so that the server 600 may communicate with the position information detector 100 and the projector 500 via the communication network 700. A connection between the network I/F unit 602 and the communication network 700 may be a cable connection or a wireless connection.

The system control unit 604 is connected to the network I/F unit 602. The system control unit 604 controls the operation of the server 600. The system control unit 604 may be formed by a processing unit, such as a CPU (Central Processing Unit) or the like.

The storage 606 is connected to the system control unit 604. The storage 606 stores the identification information of the projector 500 provided in each conference room, the distance between the user and the screen 300, and the lamp power information of the projector 500 suitable for each distance, in an associated manner for each conference room. In addition, the storage 606 stores various programs for causing the server 600 to perform various operations.

Figure 8:
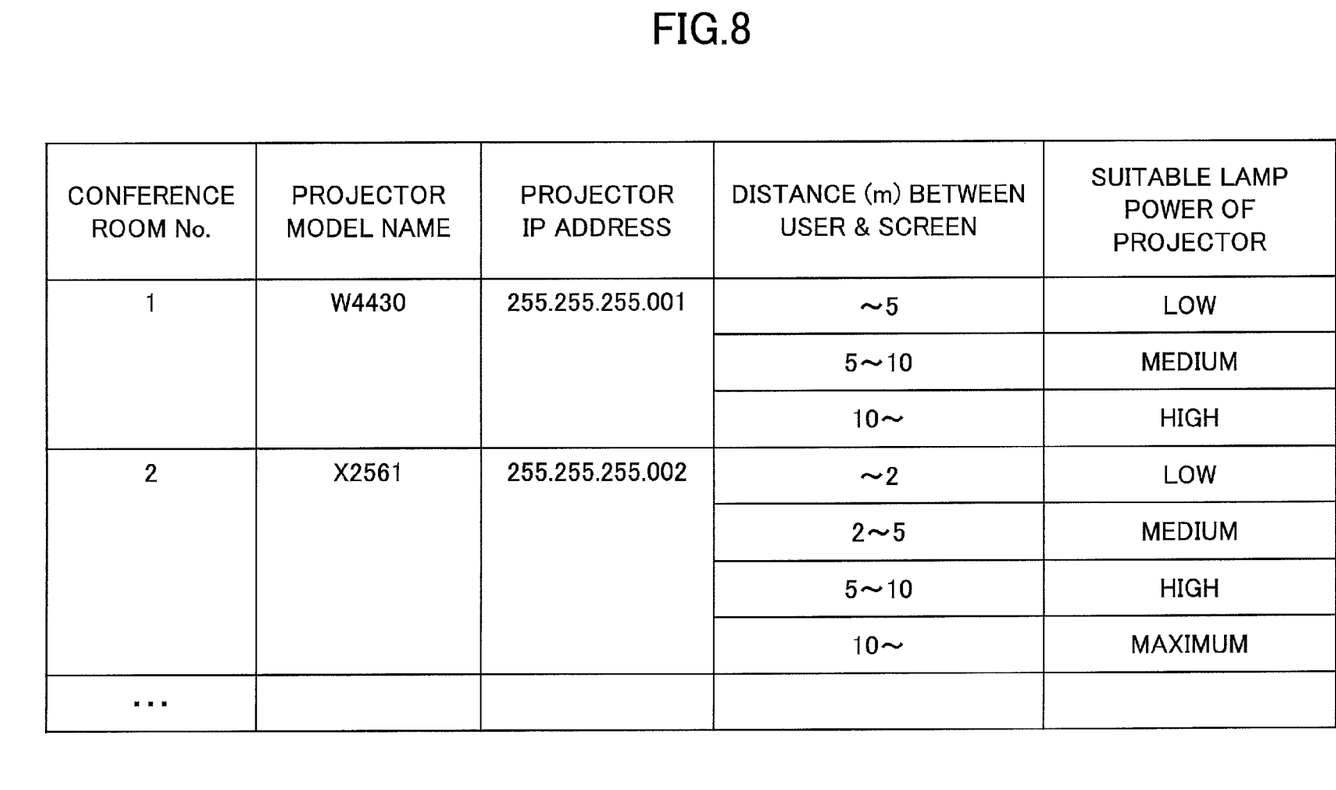
FIG. 8 is a diagram illustrating an example of a lamp power suitable for a projector.

FIG. 8 is a diagram illustrating an example of a lamp power suitable for the projector 500 in each conference room, stored in the storage 606.

The identification information of the conference room may be represented by the conference room No. The identification information of the projector 500 may be represented by the model name and the IP address of the projector 500. The distance between the user and the screen 300 is segmented into one or a plurality of segments. In this example, the lamp power information of the projector 500 is represented by "low", "medium", "high", and "maximum". However, these representations are mere examples, and the lamp power information of the projector 500 may be represented by other information.

In the example illustrated in FIG. 8, the model name of the projector 500 in the conference room No. 1 is "W4430", and the IP address of this projector 500 is "255.255.255.001". The suitable lamp power for the projector 500 in a case in which the distance between the user and the screen 300 is less than 5 meters (~5 m) is "low". The suitable lamp power for the projector 500 in a case in which the distance between the user and the screen 300 is 5 meters or greater and less than 10 meters (5 m~10 m) is "medium". The suitable lamp power for the projector 500 in a case in which the distance between the user and the screen 300 is 10 meters or greater (10 m~) is "high".

In addition, the model name of the projector 500 in the conference room No. 2 is "X256", and the IP address of this projector 500 is "255.255.255.002". The suitable lamp power for the projector 500 in a case in which the distance between the user and the screen 300 is less than 2 meters (~2 m) is "low". The suitable lamp power for the projector 500 in a case in which the distance between the user and the screen 300 is 2 meters or greater and less than 5 meters 2 m~5 m) is "medium". The suitable lamp power for the projector 500 in a case in which the distance between the user and the screen 300 is 5 meters or greater and less than 10 meters (5 m~10 m)

is "high". The suitable lamp power for the projector 500 in a case in which the distance between the user and the screen 300 is 10 meters or greater (10 m~) is "maximum".

<Functions of Server 600>

Figure 9:
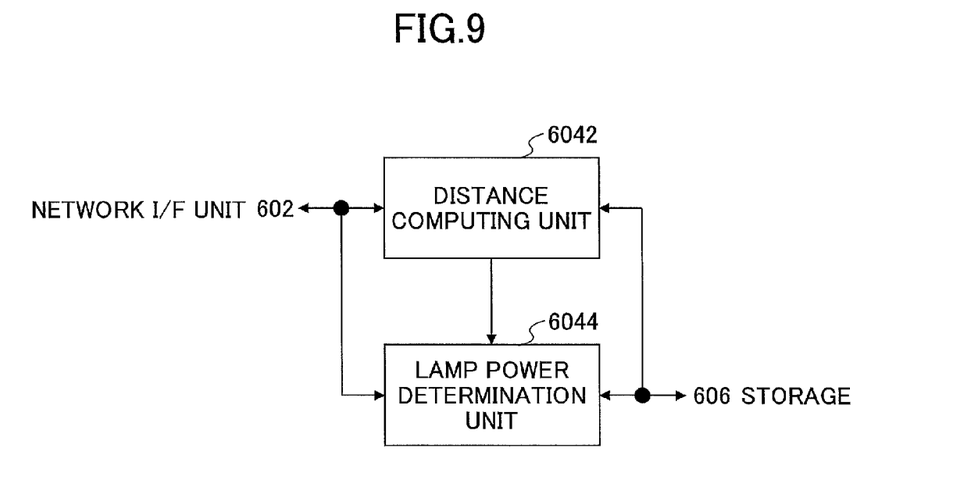
FIG. 9 is a functional block diagram illustrating a server in one embodiment.

FIG. 9 is a functional block diagram illustrating the server 600, which is an example of the information processing apparatus, in one embodiment.

The functions illustrated in the functional block diagram of FIG. 9 may mainly be performed by the system control unit 604. The processing unit forming the system control unit 604 may function as a distance computing unit 6042 and a lamp power determination unit 6044.

The processing unit forming the system control unit 604 may perform the functions of the distance computing unit 6042 and the lamp power determination unit 6044 by executing application programs (or firmware) stored within the processing unit, or by executing the application programs stored in the storage 606 provided externally to the processing unit.

The distance computing unit 6042 computes the distance between the first communication terminal 200 and the second communication terminal 400, that is, the distance between the user and the screen 300, based on the position notification information received from the position information detector 100 via the network I/F unit 602. More particularly, the distance computing unit 6042 obtains an average value (hereinafter also referred to as "average distance") of the distances between the screen 300 and the users. In other words, the average distance between each user and the screen 300 may be regarded as an estimated value of the distance between the screen 300 and the users. The distance computing unit 6042 inputs the average distance to the lamp power determination unit 6044.

The average distance between each user and the screen 300 is used in this example, however, the lamp power may be obtained based on a value other than the average distance. For example, a representative value of the positions of the users may be obtained, based on the distribution state of each of the users, and the distance between the screen 300 and the representative value of the positions of the users may be used to obtain the lamp power.

In a case in which the position information of the first communication terminal 200 and the position information of the second communication terminal 400 differ from previous respective position information according to movements of the first communication terminal 200 and the second communication terminal 400, it is preferable to recompute the distance between the first communication terminal 200 and the second communication terminal 400.

The lamp power determination unit 6044 is connected to the distance computing unit 6042. The lamp power determination unit 6044 determines the power of a lamp 540, based on the average distance from the distance computing unit 6042. The lamp power determination unit 6044 refers to the lamp power suitable for the projector 500 of each conference room stored in the storage 606, determines the conference room No. in which the projector 500 is provided, and determines the lamp power corresponding to the average distance for the determined conference room No. The lamp power determination unit 6044 transmits the lamp power setting information of the determined lamp power, to the projector 500, via the network I/F unit 602.

In addition, the distance computing unit 6042 stores the position information from the position information detector 100 in the storage 606.

Figure 10:
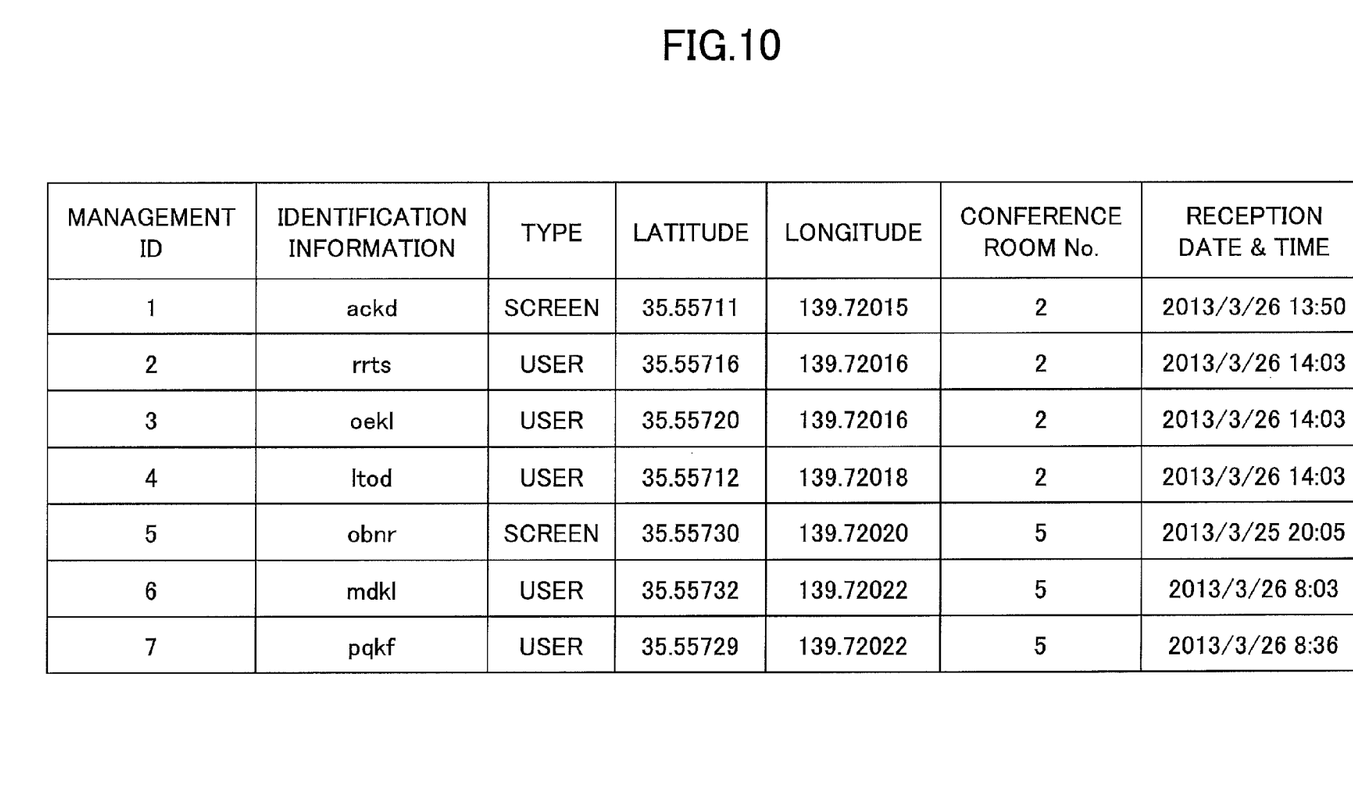
FIG. 10 is a diagram illustrating an example of information stored in the server.

FIG. 10 is a diagram illustrating an example of information stored in the storage 606 by the distance computing unit 6042 of the server 600, based on the position information from the position information detector 100.

In the example illustrated in FIG. 10, management ID, the identification information, the type, the latitude, the longitude, the conference room No., and reception date and time are stored in an associated manner. The management ID and the reception date and time are preferably added in the distance computing unit 6042. The identification information and the type are the terminal information of the first communication terminal 200 and the second communication terminal 400 included in the position notification information from the position information detector 100. The latitude, the longitude, and the conference room No. are the position information of the position information detector 100.

The information stored in the storage 606 is preferably updated every time the position information detector 100 that notifies the position notification information differs due to the movements of the first communication terminal 200 and the second communication terminal 400. In a case in which the correspondence between the identification information and the position information stored in the storage 606 differs from the correspondence between the identification information and the position information included in the position notification information notified from the position information detector 100, the identification information and the position information are updated to those notified by the position notification information from the position information detector 100. More particularly, applicable parts (management ID, identification information, type, latitude, longitude, conference room No., and reception date and time) of the position information stored in the storage 606 are deleted, and the identification information and the position information added to the position notification information notified from the position information detector 100 are newly added to the position information.

<Projector 500>

The projector 500 includes a network board 502 and a main board 512. The projector 500 further includes a remote controlled receiver 524, an operation panel 526, a display unit 528, an acceleration sensor 530, a temperature sensor 532, a power supply 534, a fan 536, a lamp control unit 538, the lamp 540, and an optical part 542. The projector 500 may additionally include a remote controller 544 and a USB (Universal Serial Bus) memory 546.

The network board 502 is used to connect the projector 500 to the communication network 700. The network board 502 communicates with the server 600 via the communication network 700. A connection between the network board 502 and the communication network 700 may be a cable connection or a wireless connection. In this embodiment, the network board 502 and the communication network 700 are connected by a cable connection.

The network board 502 includes a network I/F unit 504, a USB I/F unit 506, a network system control unit 508, and a storage 510.

The network I/F unit 504 provides an interface between the projector 500 and the communication network 700. The network I/F unit 504 may communicate with the server 600 via the communication network 700. A connection between the network I/F unit 504 and the communication network 700 may be a cable connection or a wireless connection. The network I/F unit 504 receives the lamp power setting information notified from the server 600 via the communication network 700. The network I/F unit 504 inputs the lamp power setting information to the network system control unit 508.

The USB I/F unit 506 provides an interface between the projector 500 and the USB memory 546. The USB I/F unit 506 may acquire information stored in the USB memory 546, and process the acquired information. An example of the information stored in the USB memory 546 includes video information to be projected by the projector 500. The USB I/F unit 506 inputs the video information to the network system control unit 508. In addition, the USB I/F unit 506 may store information in the USB memory 546.

The network system control unit 508 is connected to the network I/F unit 504 and the USB I/F unit 506. The network system control unit 508 inputs, to the main board 512, the lamp power setting information from the network I/F unit 504 and the video information from the USB I/F unit 506.

The storage 510 is connected to the network system control unit 508. The storage 510 stores information related to the network board 502. In addition, the storage 510 stores various programs for causing the network system control unit 508 to perform various processes.

The main board 512 includes a video signal processing unit 514, a power control unit 516, a system control unit 518, a storage 520, and an optical control unit 522.

The video signal processing unit 514 processes video signals from a signal port 5149 of an input type corresponding to the main board 512. Examples of the input type include computer, YPbPr (signals of color ratios for Hi-Vision (or HDTV (High-Definition Television)), HDMI (High-Definition Multimedia Interface), and video signals. Examples of the signal port 5140 include computer, HDMI, and video.

The power control unit 516 is connected to the power supply 534, and controls the power supply 534.

The system control unit 518 is connected to the video signal processing unit 514 and the power control unit 516. The system control unit 518 controls the operation of the projector 500. The system control unit 518 may be formed by a processing unit, such as a CPU or the like.

The storage 520 is connected to the system control unit 518. The storage 520 stores information related to the main board 512. In addition, the storage 520 stores various programs for causing the main board 512 to perform various operations.

The optical control unit 522 is connected to the system control unit 518. The optical control unit 522 controls the optical part 542.

The remote controlled receiver 524 is connected to the system control unit 518. The remote controlled receiver 524 receives operation signals generated from the remote controller 544, and inputs operation information indicated by the operation signals to the system control unit 518.

The operation panel 526 is connected to the system control unit 518. The operation panel 526 includes keys for operating the projector 500. The operation panel 526 inputs to the system control unit 518 control signals corresponding to operations performed by the user on the operation panel 526.

The display unit 528 is connected to the system control unit 518. The display unit 528 displays information to be notified to the user, under the control of the system control unit 518. Examples of the display unit 528 include LEDs (Light Emitting Diodes), indicators, and an LCD (Liquid Crystal Display) panel.

The acceleration sensor 530 is connected to the system control unit 518. The acceleration sensor 530 detects an acceleration of the projector 500. The acceleration detected by the acceleration sensor 530 is input to the system control unit 518.

The temperature sensor 532 is connected to the system control unit 518. The temperature sensor 532 detects a temperature of the projector 500. The temperature, or temperature information, detected by the temperature sensor 532 is input to the system control unit 518.

The power supply 534 is connected to the power control unit 516. The power supply 534 supplies power to the projector 500, under the control of the power control unit 516.

The fan 536 is connected to the system control unit 518. The fan 536 cools at least a part of the projector 500. For example, the fan 536 cools the power supply 534, the optical part 542, or the like.

The lamp control unit 538 is connected to the system control unit 518. The lamp control unit 538 controls the lamp 540 under the control of the system control unit 518. For example, the lamp control unit 538 controls the power of the lamp 540 according to the lamp power setting information from the system control unit 518.

The lamp 540 is connected to the lamp control unit 538. The lamp 540 operates at the power set by the lamp control unit 538.

The optical part 542 is connected to the optical control unit 522. The optical part 542 projects video to be projected onto the screen 300. Examples of the optical part 542 include a liquid crystal device in a case in which the projector 500 is formed by a liquid crystal projector, a DMD (Digital Mirror Device) or a color wheel in a case in which the projector 500 is formed by a DLP (Digital Light Processing) projector.

<Functions of Projector 500>

Figure 11:
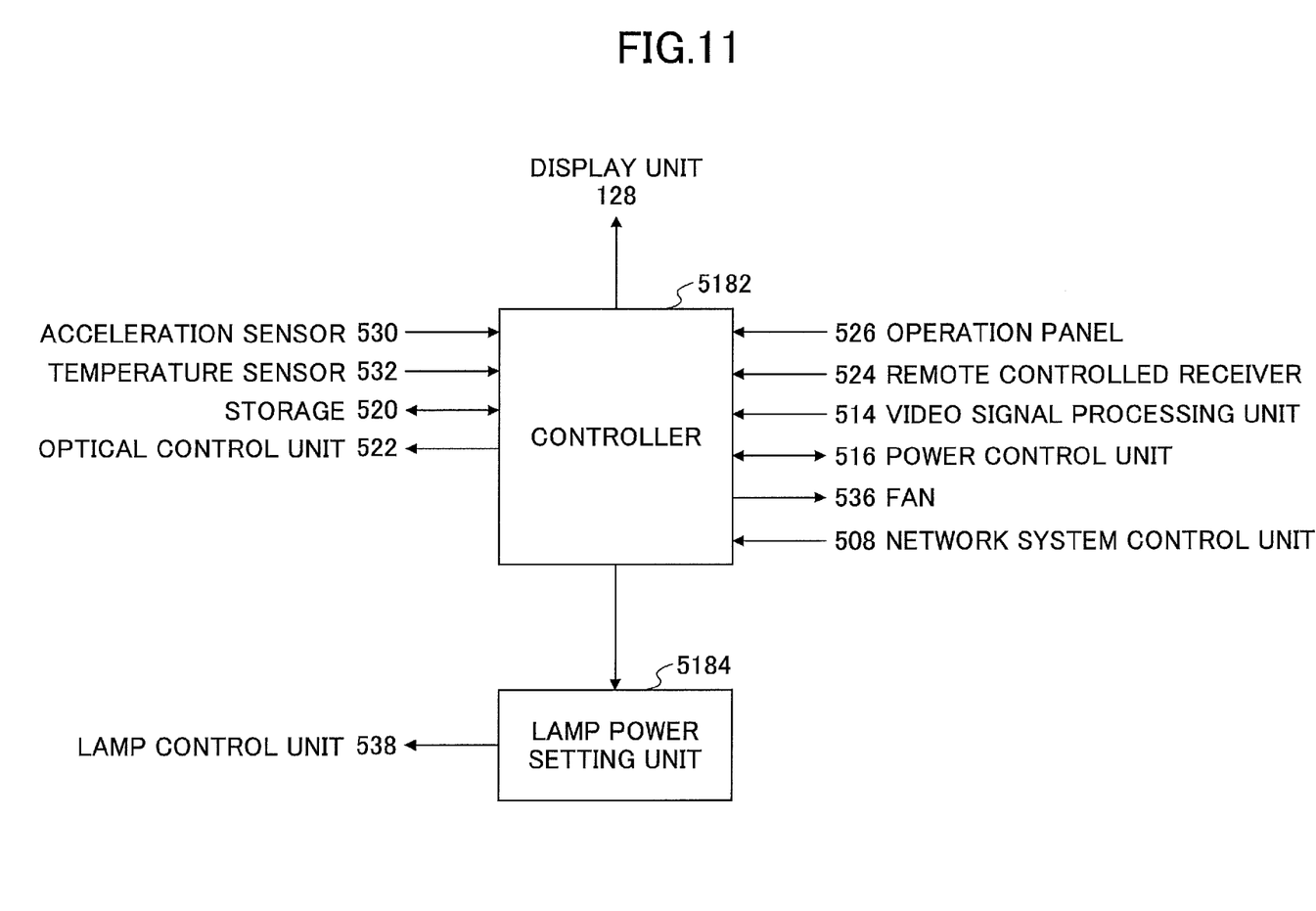
FIG. 11 is a functional block diagram illustrating the projector in one embodiment.

FIG. 11 is a functional block diagram illustrating the projector 500 in one embodiment.

The functions illustrated in the functional block diagram of FIG. 11 may mainly be performed by the system control unit 518. The processing unit forming the system control unit 518 may function as a controller 5182 and a lamp power setting unit 5184.

The processing unit forming the system control unit 518 may perform the functions of the controller 5182 and the lamp power setting unit 5184 by executing application programs (or firmware) stored within the processing unit, or by executing the application programs stored in the storage 520 provided externally to the processing unit.

The controller 5182 operates with the power supplied from the power supply 534 that is connected to the power control unit 516.

The controller 5182 performs predetermined operations according to the video signals from the operation panel 526 and the operation signals from the remote controlled receiver 524. The controller 5182 displays, on the display unit 528, operation contents of the operations performed on the operation panel 526 and operation contents represented by the operation signals from the remote controlled receiver 524.

The controller 5182 controls the operation of the optical control unit 522, in order to control the projection of the video signals from the video signal processing unit 514 onto the screen 300.

The controller 5182 controls the fan 536 based on the temperature detected by the temperature sensor 532.

The controller 5182 performs predetermined control operations based on the acceleration detected by the acceleration sensor 530.

The controller 5182 inputs to the lamp power setting unit 5184 the lamp power setting information from the network system control unit 508.

The lamp power setting unit 5184 is connected to the controller 5182. The lamp power setting unit 5184 sets the lamp power to the lamp control unit 538, based on the lamp power setting information from the controller 5182.

<Operation of Communication System>

Figure 12:
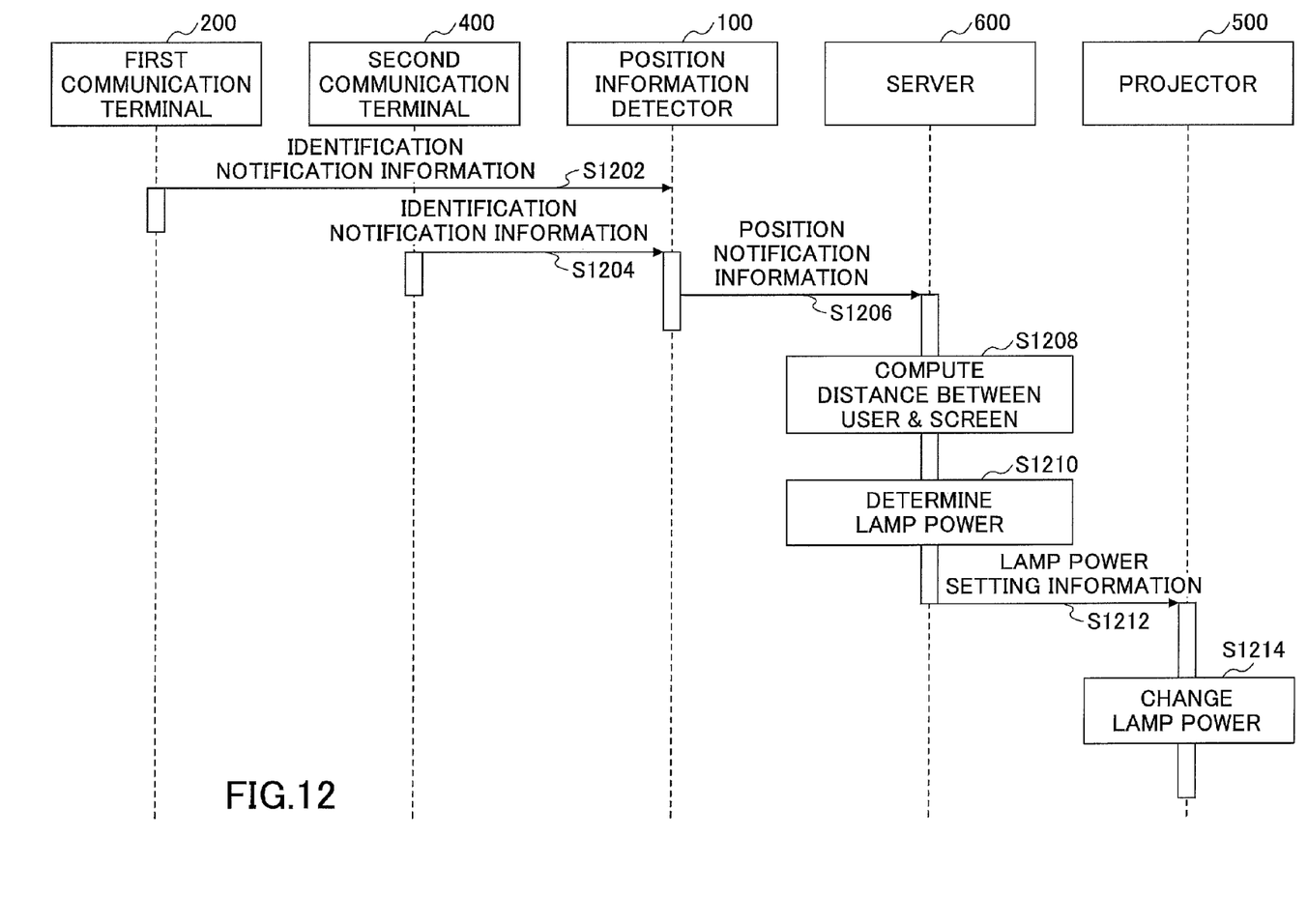
FIG. 12 is a sequence chart illustrating an operation of the communication system in one embodiment.

FIG. 12 is a sequence chart illustrating an operation of the communication system in one embodiment. FIG. 12 illustrates a case in which one first communication terminal 200 and one position information detector 100 are provided, however, the number of first communication terminals 200 and the number of position information detectors 100 are preferably plural, respectively.

In step S1202 illustrated in FIG. 12, the first communication terminal 200 transmits the identification notification information to the near position information detector 100.

In step S1204, the second communication terminal 400 transmits the identification notification information to the near position information detector 100.

In step S1206, the position information detector 100 that is notified of the identification notification information from the first communication terminal 200 or the second communication terminal 400 transmits, to the server 600, the position notification information in which the identification information of the notified identification notification information is added to the position information of the position information detector 100.

In step S1208, the server 600 computes the distance between the first communication terminal 200 and the second communication terminal 400, that is, the distance between the user and the screen 300, based on the position notification information from the position information detector 100.

In step S1210, the server 600 refers to the lamp power suitable for the projector 500 in each conference room, stored in the storage 606, and determines the lamp power based on the distance between the user and the screen 300.

In step S1212, the server 600 transmits the lamp power setting information to the projector 500.

In step S1214, the projector 500 changes the lamp power, based on the lamp power setting information from the server 600.

<Operation of Server 600>

Figure 13:
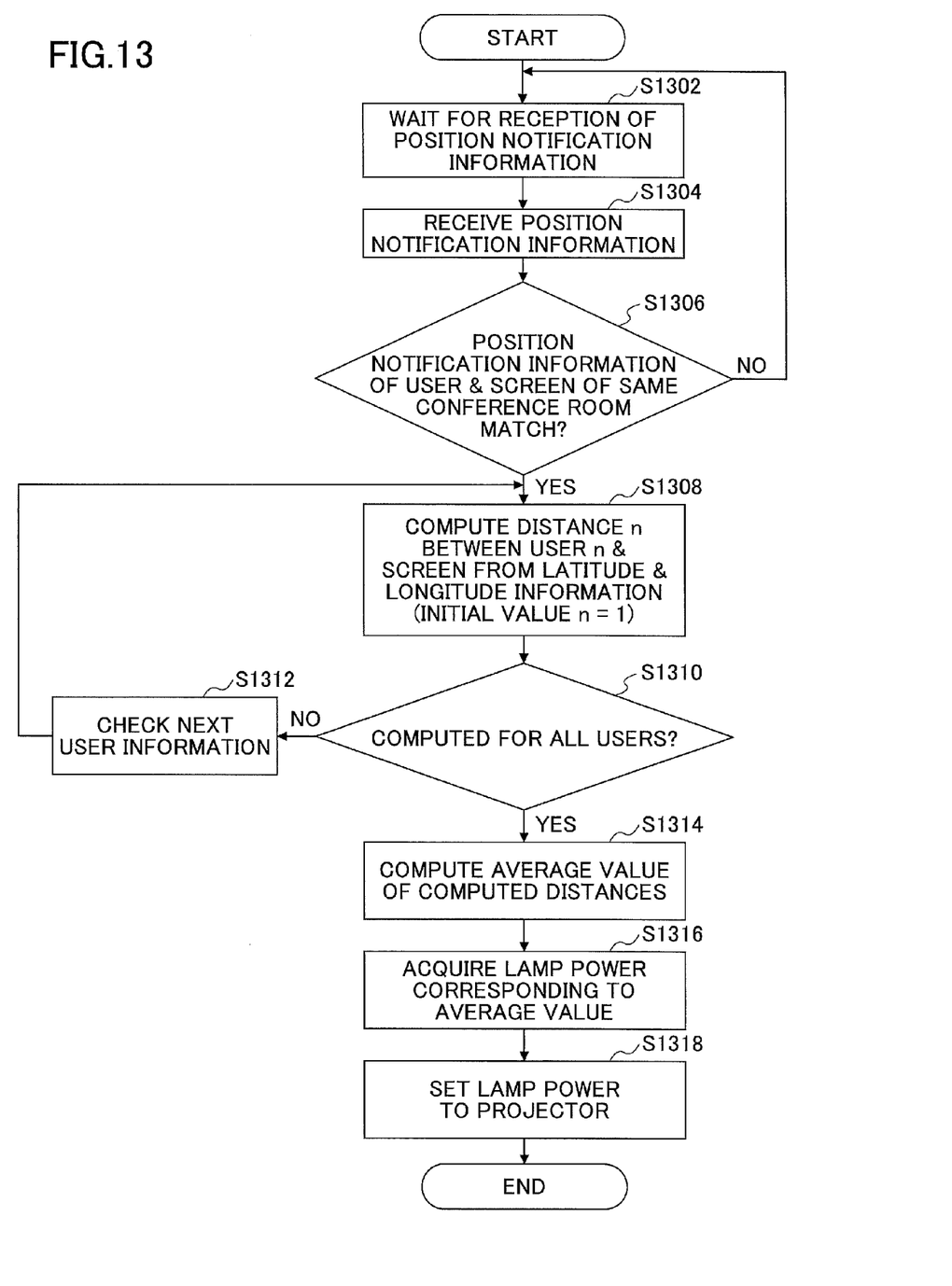
FIG. 13 is a flow chart for explaining the operation of the server in one embodiment.

FIG. 13 is a flow chart for explaining the operation of the server 600 in one embodiment.

In step S1302 illustrated in FIG. 13, the server 600 waits for reception of the position notification information from the position information detector 100.

In step S1304, the server 600 receives the position notification information from the position information detector 100.

In step S1306, the server 600 judges whether the position notification information of the user in the conference room and the screen 300 of the same conference room match. More particularly, the distance computing unit 6042 judges whether the position information of the user in the conference room and the position information of the screen 300 of the same conference room match, based on the identification information added to the position notification information received from the position information detector 100. The identification information of the user who is scheduled to enter the conference room may be set in advance in the server 600. In a case in which the distance computing unit 6042 judges that the position information of the user and the screen 300 in the same conference room do not match (that is, when a judgment result in step S1306 is NO), the process returns to step S1302.

On the other hand, in a case in which the distance computing unit 6042 judges that the position information of the user and the screen 300 in the same conference room match (that is, when the judgment result in step S1306 is YES), the process advances to step S1308. In step S1308, the server 600 computes the distance between the user and the screen 300.

More particularly, the distance computing unit 6042 computes the distance between the user and the screen 300, from the position information (latitude and longitude) of a user #n (n denotes a user in the conference room, where the initial value of n is 1) and the screen 300.

In step S1310, the server 600 judges whether the distance is computed for all users. More particularly, the distance computing unit 6042 judges whether the distance between the user and the screen 300 is computed to all users of the conference room.

The process advances to step S1312 when a judgment result in step S1310 is NO, and the process advances to step S1314 when the judgment result in step S1310 is YES. In step S1312, the server 600 checks next user information, and the process returns to step S1308. More particularly, the distance computing unit 6042 checks the next user information.

In step S1314, the server 600 computes the average value (or average distance) of each of the computed distances. More particularly, the distance computing unit 6042 computes the average value of each of the computed distances.

In step S1316, the server 600 acquires the lamp power corresponding to the average value computed in step S1314. More particularly, the lamp power determination unit 6044 acquires the lamp power corresponding to the average value of each of the computed distances computed by the distance computing unit 6042.

In step S1318, the server 600 sets the lamp power to the projector 500. More particularly, the distance computing unit 6042 sets the lamp power setting information to the projector 500. Hence, the projector 500 sets the lamp power thereof according to the lamp power setting information from the server 600.

According to the wireless network projector system in this embodiment, the distance between the screen and the user can be computed from the position information of the screen and the position information of the user, and the lamp power suited for the distance can be set to the projector.

For this reason, the projector can be set to the suitable lamp power without having the user to manually set the lamp power to the projector, and the usability or ease of operation of a wireless network projector system can be improved. For example, in a case in which the user is located at a position near the screen, the lamp power can be decreased in order to reduce the power consumption and extend the serviceable life of the lamp.

<Modification>

The wireless network projector system in one modification may be applied to the wireless network projector system illustrated in FIG. 1.

In the wireless network projector system in one modification, the position information detector 100 may transmit the position information thereof below the ceiling β within the house (or interior) α. For example, an IMES (Indoor Messaging System), which is an example of an indoor GPS (Global Positioning System) or indoor triangulation technique, may be utilized to distribute the position information.

When the first communication terminal 200 receives the position information from the position information detector 100, the first communication terminal 200 may add the identification information thereof to the position information and transmit the terminal notification information by regarding the position information detector 100 as its destination.

Further, when the second communication terminal 400 receives the position information from the position information detector 100, the second communication terminal 400 may add the identification information thereof to the position information and transmit the terminal notification information by regarding the position information detector 100 as its destination, in a manner similar to the first communication terminal 200.

The position information detector 100 may transmit (or transfer) the terminal notification information received from the first communication terminal 200 and the second communication terminal 400 to the server 600.

The server 600 may operate in the same manner as the embodiment described above.

According to the wireless network projector system in this modification, the position information detector 100, after transmitting the position information, may simply transfer the terminal notification information from the first communication terminal 200 and the second communication terminal 400 to the server 600. For this reason, compared to the embodiment described above, the processing load on the position information detector 100 may be reduced.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP (Wireless Application Protocol) or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, a hard disk, a CD-ROM (Compact Disk-Read Only Memory), a magnetic tape device or a solid state memory device.

The hardware platform includes any desired hardware resources including, for example, a CPU, a RAM (Random Access Memory), and a HDD (Hard Disk Drive). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

According to the embodiments and modifications described above, it is possible to suitably or automatically set a lamp power of a projection apparatus (or projector).

Further, the present invention is not limited to these embodiments, but various variations, modifications, and substitutions may be made without departing from the scope of the present invention.

What is claimed is:

1. An information processing apparatus comprising:
  a communication unit configured to communicate with a plurality of position information notifying apparatuses that store position information thereof and notify, in a case in which a communication is made with a plurality of first communication terminals that are held by respective users, identification information of the plurality of first communication terminals and the position information, and in a case in which a communication is made with a second communication terminal that is mounted on a screen, identification information of the second communication terminal and the position information; and
  a control unit configured to obtain an estimated value of distances between the screen and the users, from distances between the second communication terminal and each of the plurality of first communication terminals, based on the position information received from the plurality of position information notifying apparatuses by the communication unit, and to determine a lamp power to be set to a projection apparatus that projects video on the screen, based on the estimated value,
  wherein the communication unit notifies the lamp power determined by the control unit to the projection apparatus.

2. The information processing apparatus as claimed in claim 1, wherein the control unit obtains the estimated value of the distances between the screen and the users, by obtaining an average value of the distances between the second communication terminal and each of the plurality of first communication terminals, based on the position information received by the communication unit from the plurality of position information notifying apparatuses.

3. The information processing apparatus as claimed in claim 1, wherein the plurality of first communication terminals and the second communication terminal communicate with the plurality of position information notifying apparatuses using a near field communication technique.

4. The information processing apparatus as claimed in claim 1, wherein the control unit changes the lamp power based on the identification information of at least one of the plurality of first communication terminals when the position information of the at least one of the plurality of first communication terminals changes.

5. An information processing method comprising:
  a communication process, performed by an information processing apparatus, to communicate with a plurality of position information notifying apparatuses that store position information thereof and notify, in a case in which a communication is made with a plurality of first communication terminals that are held by respective users, identification information of the plurality of first communication terminals and the position information, and in a case in which a communication is made with a second communication terminal that is mounted on a screen, identification information of the second communication terminal and the position information; and
  a control process, performed by the information processing apparatus, to obtain an estimated value of distances between the screen and the users, from distances between the second communication terminal and each of the plurality of first communication terminals, based on the position information received from the plurality of position information notifying apparatuses by the communication process, and to determine a lamp power to be set to a projection apparatus that projects video on the screen, based on the estimated value,
  wherein the communication process notifies the lamp power determined by the control process to the projection apparatus.

6. The information processing method as claimed in claim 5, wherein the control process obtains the estimated value of the distances between the screen and the users, by obtaining an average value of the distances between the second communication terminal and each of the plurality of first communication terminals, based on the position information received by the communication process from the plurality of position information notifying apparatuses.

7. The information processing method as claimed in claim 5, wherein the plurality of first communication terminals and the second communication terminal communicate with the plurality of position information notifying apparatuses using a near field communication technique.

8. The information processing method as claimed in claim 5, wherein the control process changes the lamp power based on the identification information of at least one of the plurality of first communication terminals when the position information of the at least one of the plurality of first communication terminals changes.

* * * * *